Jan. 9, 1934.     E. R. FELLOWS     1,942,416
HELICAL GEAR GRINDING MACHINE
Original Filed Sept. 29, 1931     2 Sheets-Sheet 1
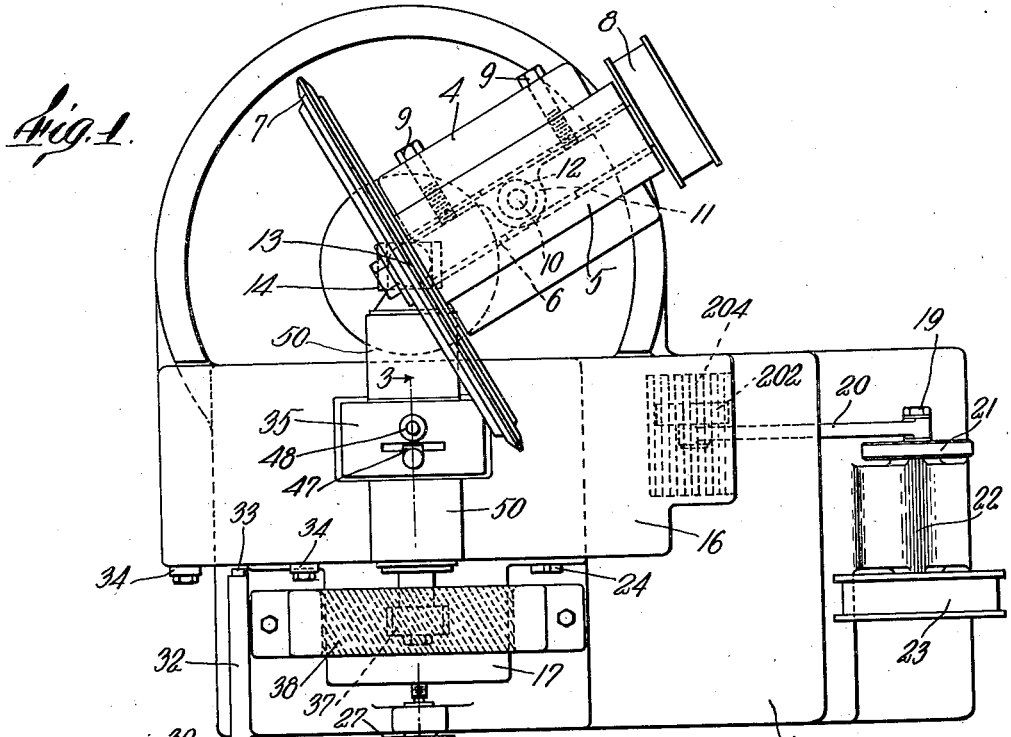
Fig.1.
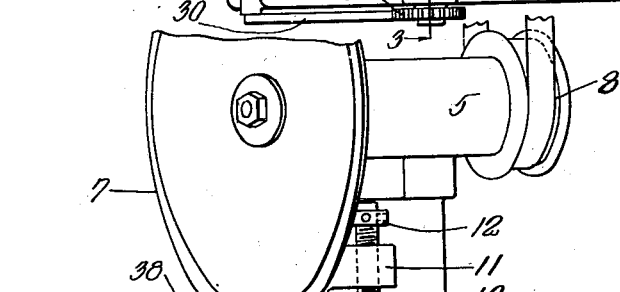
Fig.2.
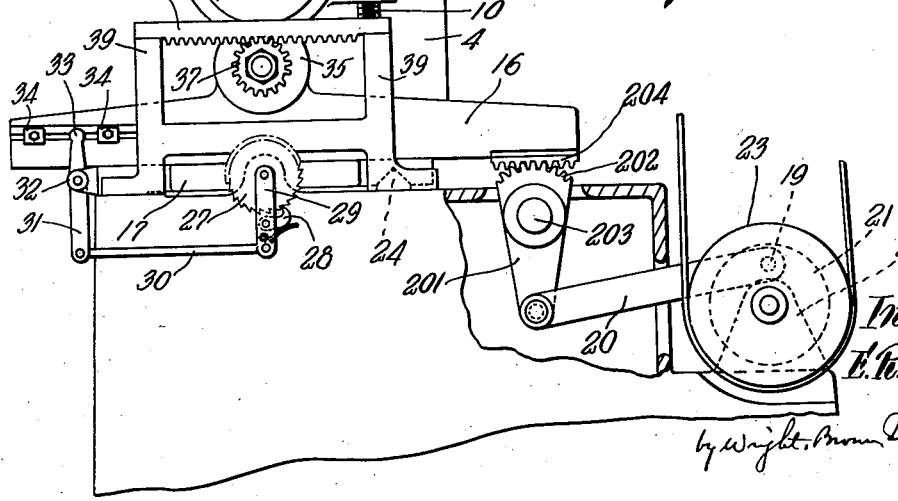
Inventor
E. R. Fellows
by Wright, Brown, Quinby & May
Attys.

Jan. 9, 1934.   E. R. FELLOWS   1,942,416
HELICAL GEAR GRINDING MACHINE
Original Filed Sept. 29, 1931   2 Sheets-Sheet 2
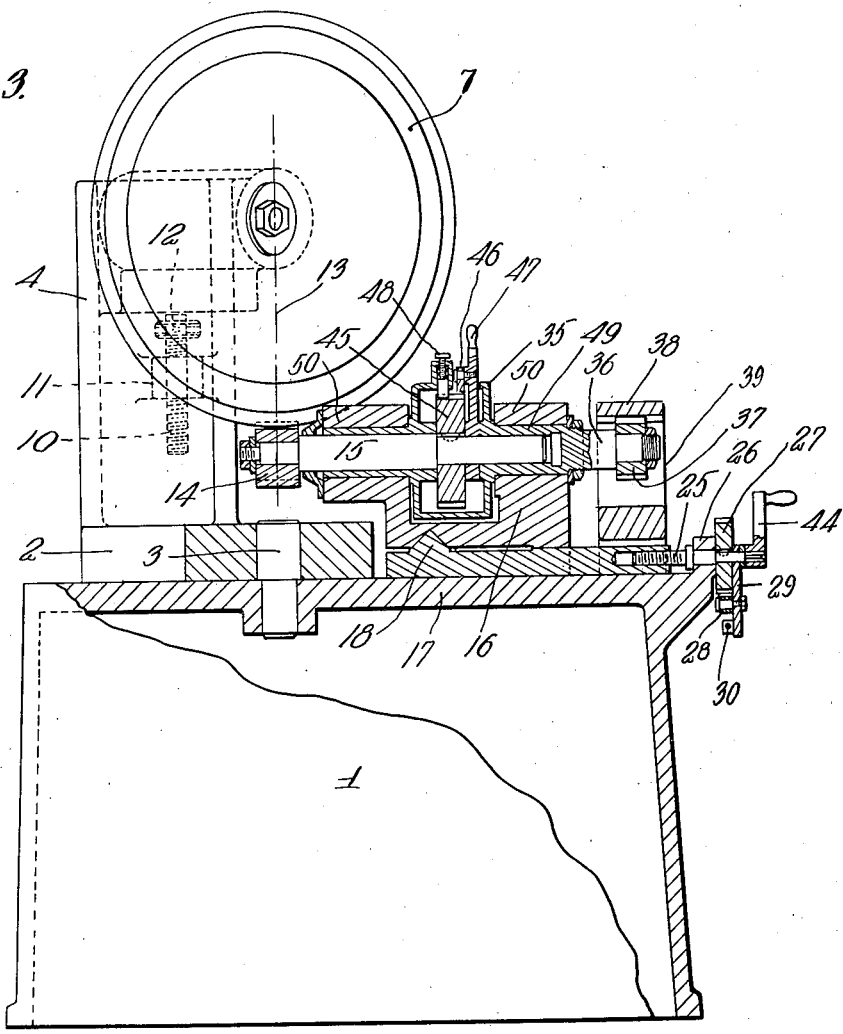
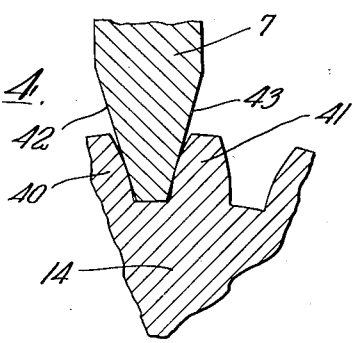

Patented Jan. 9, 1934

1,942,416

UNITED STATES PATENT OFFICE 1,942,416

HELICAL GEAR GRINDING MACHINE

Edwin R. Fellows, Springfield, Vt., assignor to The Fellows Gear Shaper Company, Springfield, Vt., a corporation of Vermont Application September 29, 1931, Serial No. 565,832. Renewed June 6, 1933

7 Claims. (Cl. 51—123)

The present invention relates to the art of generating gears by grinding, particularly gears of which the teeth are helically arranged and have involute face curves. Its main and general object is to generate helical gears of any helix angle with uniformity of face curvature from end to end, and to carry on the grinding of all the teeth of the gear from start to finish in the practicable minimum of time and with the minimum of lost motion. Generation of helical gears by grinding, and particularly those of large helix angle, has in the past been attended with considerable difficulties in respect to either the maintenance of uniformity from end to end of the tooth and at the same time generating involute curves capable of rolling in mesh with the teeth of a companion gear, or correctly locating the grinding wheel when one having a plane active face is used; and when the wheel is of the plane faced type, it can act on only one face of a tooth at a time, thus requiring two complete cycles of operations to finish a single gear. My purpose and the accomplishment of this invention have been to overcome these and allied difficulties.

Defining at this point certain terms as used in this specification, I will say that the ends of the gear teeth are considered to be their extremities in the end planes or faces of the gear. The tip or point of the tooth is the extremity farthest from the axis, and the root or base of the tooth is the part nearest to the axis. That is, "end" as used herein with reference to a tooth is distinguished from the tip or outer extremity in the radial direction. The term "helix angle" signifies the acute angle between a line which is tangent at the same time to the base of any tooth and the pitch cylinder of the gear, and that diametral plane of the gear which includes the point of tagency of such line.

In effecting these objects I use a grinding wheel which is beveled equally on both opposite faces adjacent to its circumference, and adjusted so that it will act equally on the contiguous faces of two teeth of the gear bounding the space in which it is located. I produce a relative rolling movement between the grinding wheel and work piece, like that occurring between a rack and mating gear when running in mesh, for generating the gear tooth curves; and I effect a further relative movement between the grinding wheel and work, which is compounded of translation in the direction of the axis of the work piece and revolution about such axis at such a rate as to feed or transfer the grinding action along the gear tooth without altering the rolling relationship between the grinding wheel and work. The machine is also equipped with indexing means suitably organized to bring the teeth of the gear successively into position for being ground.

The grinding wheel is arranged with a radius perpendicular to and intersecting the axis of the work (when the work is in the mid position of its rolling traverse, as shown in the drawings) and with its plane inclined to such axis at an angle equal to the helix angle of the gear teeth. Its acting faces are given a form in profile conjugate to the gear teeth to be generated, which, in the case for grinding involute teeth is that of a rack tooth capable of meshing with the gear. By using a wheel of sufficiently large diameter in proportion to the gear, the beveled faces may be formed as true cones with satisfactory effect. But it is within my contemplation to modify such faces in any manner desired to produce special forms of gear teeth.

Such a wheel has theoretical point tangency with the faces of the gear tooth, but in practice as it cuts into the material of the gear, it contacts therewith over a substantial area surrounding the theoretical tangent point and having wider dimensions longitudinally than radially of the gear teeth. The depth of cut is greatest at such theoretical tangent point, and it diminishes gradually to the periphery of the contact area. Elsewhere the faces and circumference of the wheel are clear of the gear tooth faces, and involve no difficulties of interference. In the preferred form of the machine, the wheel remains in the same position while in operation, and its action is carried over the faces of the gear teeth by rolling the gear past the wheel and feeding the gear helically with a combination of axial and rotative movements. Preferably also indexing is accomplished by turning the gear independently through the angular space of one tooth while it is at one end of its rolling traverse and out of contact with the grinding wheel.

I have accomplished the same objects and effects by another invention claimed in a companion application for patent Serial No. 565,831 filed September 29, 1931. The present application discloses and claims an alternative means consisting of a master helical gear and rack for obtaining the same result.

In the drawings,—

Fig. 1 is a plan view of the machine;

Fig. 2 is a right hand end elevation of the machine;

Fig. 3 is a partial front elevation and partial section through the axis of the work spindle taken on line 3—3 of Fig. 1;

Fig. 4 is a fragmentary view showing on an enlarged scale the sectional profile of the grinding wheel and two teeth of a helical gear in engagement therewith.

Like reference characters designate the same parts wherever they occur in all the figures.

The base 1 of the machine supports a pedestal 2 angularly adjustable about a pivot 3 from which rises an upright or post 4. A housing or shaft bearing 5 is secured to the post 4 and holds rotatably a shaft 6, to one end of which is secured the grinding wheel 7, and to the other end of which is secured a driving belt pulley 8. The housing is secured to the post 4 by screws 9 which latter pass through vertical slots in the post and are threaded into the housing so as to permit vertical adjustment and withdrawing movement of the wheel, and to clamp the housing in any of its possible adjustments. A screw 10 which passes through a tapped lug 11 on the post, and has a capstan head 12 for turning it, serves as a means for elevating the wheel and also as a stop to arrest the wheel on its return after having been withdrawn by other means from the work. The upper end of this screw underlies a shoulder on the wheel shaft housing.

The axis of the pivot stud 3, prolonged, passes through the diameter of the grinding wheel midway between its opposite faces, and is indicated in Fig. 1 by the point 13, and in Fig. 3 by the line 13.

The work piece 14, a helical gear which has been previously cut nearly to finished form and dimensions, has a small amount of surplus stock remaining to be removed, and is secured to a spindle 15 which is rotatably supported in bearings in a work carriage 16. The carriage rests on a feed slide 17, which in turn rests on the base 1. The carriage is movable to right and left with respect to Figs. 1 and 2, and to front and rear with respect to Fig. 3, being guided in a given path by a guide rib 18 on slide 17, and being actuated by a crank pin 19 and connecting rod 20. The crank pin is carried by a disk 21 on a shaft which turns in a bearing 22 on the machine base, and to which is secured a belt pulley 23. Reduced motion is transmitted to the slide by the connecting rod through a lever 201 on a pivot 203, a gear segment 202 carried by the lever, and a rack 204 on the carriage in mesh with the segment.

Feed slide 17 is guided to move lengthwise of the work spindle axis by means of a guide rib 24 on the machine base and is actuated to that end by the reciprocating carriage 16. The specific means here illustrated for so moving the feed slide consists of a screw shaft 25 having threaded engagement with the slide and rotatably supported in a bearing lug 26 in the base, a ratchet wheel 27 secured to the screw shaft, a pawl 28 cooperating with the ratchet, an arm 29 swinging about the screw shaft and carrying the pawl, a link 30 connecting the pawl carrier with an arm 31 on rock shaft 32, and an arm 33 projecting from the rock shaft between separated adjustable dogs or stops 34 carried by the work carriage.

The work spindle 15 is connected to a rolling head 35 through indexing means, later decribed, and such rolling head has an extension 36 on which is mounted, coaxially with the work piece, a master gear 37 of the same pitch diameter and helix angle of tooth as the work piece. This master gear meshes with a complemental, or conjugate, master rack 38 of which the teeth have the same helix angle, which is supported by the uprights 39 of a frame secured to the machine base, such uprights being separated far enough to permit the necessary travel of the work carriage for full sweep of the gear tooth faces over the grinding faces of the wheel 7.

It will be understood from the foregoing description that when the work carriage is moved to either side from the mid position shown in the drawings, the master gear and rack cause the teeth 40 and 41 (Fig. 4) of the work piece, which flank the grinding wheel, to be rolled past the adjacent rim of the wheel in the manner of a gear rolling along a stationary rack. As the profile of the grinding wheel in the rolling plane is the same as that of a rack tooth conjugate to the gear, this movement causes the engaging face of gear tooth 40 to be generated to involute curvature from root to tip by the grinding wheel face 42, and the adjacent face of tooth 41 to be similarly generated by the grinding wheel face 43.

It will be understood that the traverse given to the carriage is sufficient to cause both tooth faces thus to roll over their entire involute curvatures in contact with the wheel, and that the supports 39 for the controlling rack are spaced far enough apart to permit such range of movement.

The grinding cycle is started with the work in position to be thus ground at one of its ends, and as the action progresses the entire carriage is fed slowly in the direction of the work spindle axis; i. e., the work is fed endwise, by means of the feed mechanism designated by the parts 25—34 inclusive. This feed takes place relatively to the rack 38, which remains stationary, whereby the inclined teeth of the rack, in cooperation with the helical teeth of the master gear 37, cause the work piece to be incrementally rotated sufficiently to maintain its teeth, in the part of the gear through which the diameter 13 of the grinding wheel passes, always in the same relationship to the profile of the grinding wheel. By providing a sufficiently fine or slow axial feed with a relatively rapid rolling traverse of the work, the tooth curves are generated accurately throughout the length of the gear.

At the conclusion of the cycle, i. e., when the grinding action has progressed all the way from one end of the gear to the other, the grinding wheel is withdrawn clear of the work, and the carriage retracted to starting position. This withdrawal of the grinding wheel may be effected by manually turning the screw 10, or by other means; and the retraction of the slide may be effected by manually rotating a crank 44 applied to the end of the feed screw shaft. When clear of the wheel, the work is indexed to bring another tooth into grinding position, the wheel is returned to previous position, and the cycle is repeated.

A hand operated work indexing mechanism is shown in Fig. 3. It comprises an index plate or wheel 45 secured to the work spindle, a pawl 46 cooperating with notches or teeth on said plate and carried by a lever 47 which is rotatably supported by the work spindle 15, and a retractable locking pin 48 carried by the rolling head 35 and adapted to engage the notches or teeth of the index plate. In order to provide for both functions of rolling and indexing of the work, the spindle 15 is mounted rotatably and coaxially in the rolling head, which latter is equipped with trunnions 49 rotatable in the bearings 50 of the carriage.

Neither the description of a specific intermittent axial feed mechanism, nor that of a machine as manually operated in part, is intended or to be construed as a limitation of the invention or of the protection here claimed. It is within my contemplation to provide a continuous feed and to make the machine wholly automatic, with provisions for supplying a cooling fluid to the work, and with any additions and accessories which may be desirable for an automatic machine. I have shown a very simple machine here for the purpose of clearly illustrating the general principles without the complication of much accessory detail, but I intend the scope of the protection herein claimed to include these principles in all their possible modes of application.

What I claim and desire to secure by Letters Patent is:

1. A machine for generating involute helical gears comprising a cutting tool, a work holder, means for effecting relative movements between the work holder and tool both lengthwise and transversely of the axis of the work piece in the course of generating a single gear tooth, and means comprising a helical master gear connected to the work spindle, and a conjugate rack for imparting rolling movements to the work spindle and progressive angular movements in one direction with relative axial movement between the work spindle and rack.

2. In a machine of the character described, a means for producing oscillative and progressive rotary movements to the work spindle, comprising a helical master gear connected to the spindle, a conjugate rack in mesh with said gear, and means for effecting relative movements of translation between the spindle and rack both crosswise and lengthwise of the spindle.

3. In a helical gear generating machine, a work carriage, a feed slide on which said carriage is mounted to move back and forth in one path, said slide being movable itself in directions transverse to the movements of the carriage, a rotatable work spindle on the carriage having its axis parallel to the movements of the feed slide, a helical master gear connected to said spindle, and a conjugate rack meshing with said master gear and supported independently of the slide.

4. A machine for generatively grinding involute helical gears comprising a base, a feed slide mounted to move in a given path on the base, a work carriage mounted on said slide to move back and forth in a path transverse to the first named path, a work spindle rotatively mounted in the work carriage with its axis extending in the same direction as the first named path, a helical gear connected to said spindle coaxially therewith, and a master rack having teeth conjugate to said helical gear and in mesh therewith mounted relatively stationary on the base.

5. A gear generating machine as set forth in claim 4 combined with a grinding wheel having grinding faces conjugate to the face curves of two adjacent teeth to be produced, and means for mounting said grinding wheel with its rim intersecting the pitch cylinder of a gear mounted on the spindle and extending in a plane corresponding to the helix angle of such gear.

6. A machine as set forth in claim 4 including the combination with the subject matter there claimed of indexing means for effecting a relative angular displacement between the spindle and master gear.

7. In a machine of the character described, a cutting tool, a work spindle, a holder for supporting said work spindle, a master helical gear connected to the work spindle and a master rack conjugate to said gear and in mesh therewith; combined with means for producing relative movements between the work holder and tool both crosswise and lengthwise of the work spindle axis, and effecting similar relative movements between said master gear and rack.

EDWIN R. FELLOWS.